Nov. 21, 1967
JAMES E. WEBB
ADMINISTRATOR OF THE NATIONAL AERONAUTICS
AND SPACE ADMINISTRATION
MULTISLOT FILM COOLED PYROLYTIC GRAPHITE ROCKET NOZZLE
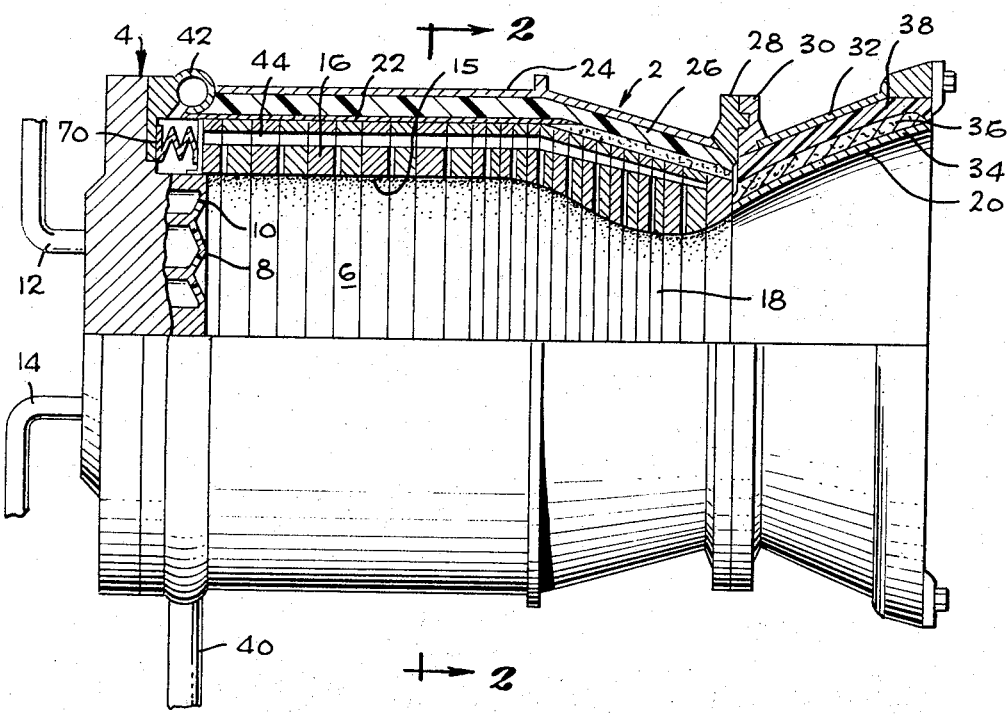
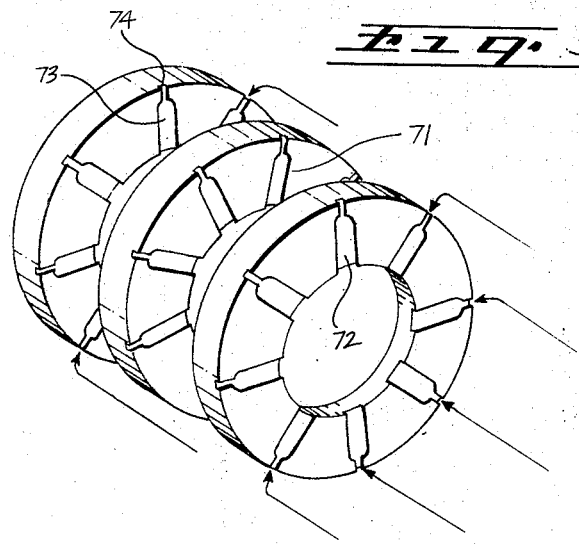
CLIFFORD D. COULBERT
JOHN G. CAMPBELL
INVENTORS

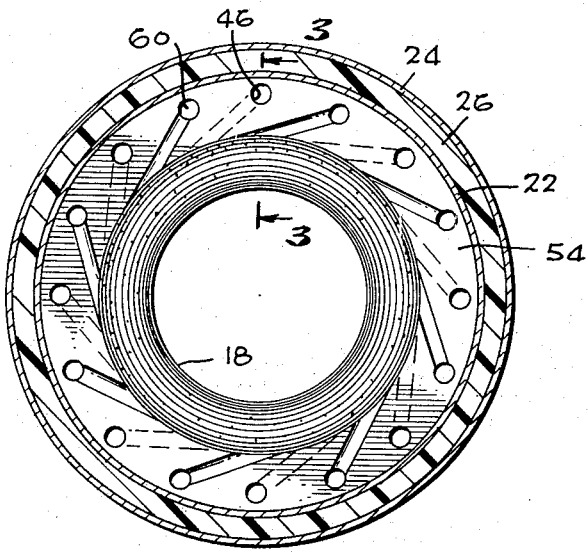
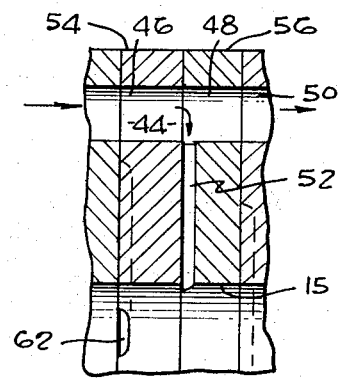
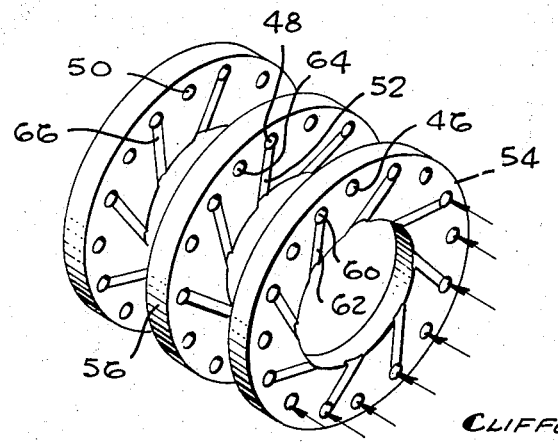

# United States Patent Office 3,353,359
Patented Nov. 21, 1967

3,353,359
MULTISLOT FILM COOLED PYROLYTIC
GRAPHITE ROCKET NOZZLE
James E. Webb, Administrator of the National Aeronautics and Space Administration, with respect to an invention of Clifford D. Coulbert and John G. Campbell
Filed Jan. 26, 1966, Ser. No. 523,511
2 Claims. (Cl. 60—265)

ABSTRACT OF THE DISCLOSURE

A rocket engine having a nozzle wall formed of a plurality of washers. Each washer has a plurality of grooves in one face that cooperates with an adjacent washer to form a plurality of passages opening into the interior of the nozzle. The passages admit cooling fluid for boundary layer cooling. The grooves of one washer are circumferentially off-set relative to grooves of an adjacent washer to evenly distribute cooling fluid around the nozzle wall. In addition, resilient means are provided to bias the washers toward each other to permit expansion of the washers.

---

The invention described herein was made in the performance of work under a NASA contract and is subject to the provisions of Section 305 of the National Aeronautics and Space Act of 1958 Public Law 85–568 (72 Stat. 435; 42 U.S.C. 4257).

This invention relates to gas generating devices such as rocket engines and the like.

More particularly, this invention relates to a novel structure and method for cooling a rocket engine or other gas generating devices.

With the advent of gas generating devices such as rocket engines, it has become necessary to provide some means whereby the engine nozzle wall structure can be cooled from the effects of high temperatures encountered during combustion. This cooling problem is present not only in rocket engines utilizing mono-propellant or bi-propellant liquids, but also with solid rocket engines and hybrids. Many methods have been employed or suggested in the past and include the following.

One of the more common methods by which a rocket engine is cooled is the so-called regenerative cooling method. In this type of cooling, the thrust chamber or nozzle is formed of axially extending tubes which contain a coolant. In most cases, this coolant is one of the propellants. The propellant is passed down the tube through the length of the rocket engine and then reversed in direction to pass up the rocket engine to the injector for injection into the combustion chamber. This method is relatively complex and while effective, requires high pump capacity to overcome the friction and viscosity losses encountered as the propellant passes through the tubes.

Another method by which an engine structure is protected from the high temperatures encountered is by insulating the nozzle wall. This suffers from the disadvantage that good insulating materials are generally unknown and in addition add to the weight of the engine.

Another method by which engines have been cooled is by the so-called "film cooling" process. In this process a film of coolant is injected at the periphery of the injector and passes downwardly along the nozzle wall forming a boundary layer of fluid between the nozzle wall and the combustion chamber gases. A similar method is the so-called "transpiration" method of cooling in which a plurality of coarse apertures or holes are formed in the nozzle wall through which passes a coolant. This is similar to film cooling in that a boundary layer for cooling the nozzle wall is formed. An example of this type of cooling is disclosed in the U.S. Patent to Vest, No. 3,069,847. This method, however, suffers the disadvantage of lack of control due to the inability to accurately control the velocity of the coolant through the nozzle wall material. In addition, blockage can result in the porous passages thus rendering the operation inefficient and less effective.

In another method of cooling a rocket engine it has been proposed that an endothermic reaction occur between the walls of the nozzle and the combustion chamber gases as high temperatures are encountered. In this endothermic reaction, the nozzle wall undergoes a chemical reaction which in doing so absorbs a great amount of heat thus maintaining the structural integrity of the remainder of the nozzle wall.

Another type of cooling which has been employed in smaller rocket engines resides in the ablative process. In the ablative process, the material comprising the nozzle wall, as it undergoes erosion, chars and absorbs heat.

In another type of cooling structure and method, a very thin nozzle wall is employed which is typically constructed of a refractory metal. However, this is expensive and in addition, since the cooling is accomplished by radiation away from the nozzle wall to the outside environment, the nozzle wall is subject to destruction due to the thinness thereof and the presence of pressure "spikes" in the nozzle or combustion chamber. These "spikes" are the result of combustion instability.

It has been proposed also to construct at least a portion of the nozzle wall of pyrolytic graphite. An example of this can be found in U.S. Patent No. 3,156,091 to Kraus.

All of the above methods and means of cooling a rocket engine, while proving effective in certain examples and ineffective in others, all suffer disadvantages of costs, complexity, lack of control, too much weight or other disadvantages. It is to obviate many of the disadvantages of the prior art structures to which this invention is directed.

Briefly, this invention comprises a gas generating device such as a rocket engine which has a thrust chamber or nozzle wall comprised of a stacked series of pyrolytic graphite wafers or washers.

Passages in the longitudinal direction of the engine are provided through the washers to allow the flow of coolant therethrough. Alternatively, an annular manifold surrounding the washers can provide coolant for distribution to the various washers. Connected to the longitudinal passages or manifold are a series of grooves on the face of each washer terminating on the inside surface of the washers. Upon introduction of coolant into the longitudinal passages or manifold, a portion of the coolant will pass out through each of the grooves so as to be injected along the nozzle wall to act as a film coolant. By design of each groove to provide the minimum required coolant at each location, this invention approaches the cooling advantages of a transpiration cooled engine without the disadvantages thereof.

An object of this invention is to provide an improved gas generating device.

Another object of this invention is to provide an improved structure for cooling a rocket engine or the like.

Still another object of this invention is to provide an improved method of cooling a rocket engine.

Other objects and advantages of this device will become apparent as this description proceeds taken in conjunction with the drawings in which:

FIG. 1 is a view partially in cross section of a rocket engine constructed according to this invention;

FIG. 2 is a cross sectional view of the rocket engine as viewed along lines 2—2 of FIG. 1;

FIG. 3 is a view of a portion of the rocket engine of FIG. 2 as viewed along the lines 3—3 thereof;

FIG. 4 is an exploded view of three of the washers as assembled in the structure of FIG. 1; and FIG. 5 is a modification of the washers shown in FIG. 4 and shows a construction wherein an annular coolant manifold may be exterior to the washers.

Referring to FIG. 1, there is shown a rocket engine designated generally at 2. This rocket engine includes an injector shown at 4 for the introduction of propellants into combustion chamber 6. Injector 4 includes conventional injector passages 8, 10 and others not shown. Manifolds are provided in injector 4 in the conventional manner such that fuel entering line 12 and oxidizer through line 14 can each be injected into combustion chamber 6 through injector 8 and 10 and others not shown so as to impinge upon each other at which time combustion occurs. This combustion process can be initiated by any means well known in the art and may include, for example, a pyrotechnic igniter, a spark plug, or the ignition may be hypergolic. In any event, the injector and associated plumbing forms no part of this invention.

Combustion chamber 6 is formed by a plurality of washers or wafers and in the embodiment shown comprise pyrolytic graphite. Pyrolytic graphite has the unique capability of having a greater rate of heat conductivity in one direction than in other directions. In the instant case, the rate of heat transfer is greater in the radial direction than in the axial direction of the washers. Thus, heat absorbed at the interface 15 of the washers 16 will traverse in a radially outward direction at a greater rate than in the axial direction. The washers are varied in size so that the combustion chamber will diverge to form a throat area 18. The nozzle then diverges to allow expansion of the gases to aid in thrust against nozzle wall 20. As the washer thickness is reduced, the coolant injection grooves can be more closely spaced in the axial direction, providing greater cooling effectiveness.

Surrounding the washers and aiding to hold them in place is a shield 22. Spaced from this shield is another shield or sleeve 24, between shields 22 and 24 is placed any convenient material for insulating as shown at 26. Flange member 28 is attached by any convenient means such as by nuts and bolts not shown to another flange member 30 which is in turn attached to sleeve member 32. Sleeve 34 is placed between graphite 36 and the nozzle interior. Graphite 36 functions as a heat sink and insulation 38 is provided as shown.

Conduit 40 is provided for the introduction of coolant. This coolant is injected or otherwise delivered to manifold 42 which connects with passages 44 in pyrolytic graphite washers 16. Alternatively, coolant passages 44 can be exterior to the washers 16 with the coolant passing longitudinally between the shield 22 and the washers 16. The washers may then be aligned and held in place by longitudinal stringers (not shown) placed between the washers 16 and the shield 22.

A more detailed illustration of how passages 44 are formed is shown in FIGS. 3 and 4. When the washers are aligned, passages 44 are formed by apertures 46, 48 and 50 as shown in both FIG. 3 and FIG. 4. By this arrangement, and by providing grooves such as 52, fluid will flow or pass through one passage aperture 46 without being able to pass into the combustion chamber. As the fluid flows through passage 46 in washer 54, it will enter passage 48 of washer 56. At this time, a portion of the fluid will be allowed to pass through straight or linear groove 52 into the combustion chamber. This groove together with the flat backface of washer 54 forms a passageway for the coolant. The fluid flow then continues through passage 50 and when it reaches or passes through the next passage in the adjacent washer will likewise meet a groove and allow it to pass into the combustion chamber.

In a similar manner, fluid flow passing through aperture 60 will pass through groove 62 into the combustion chamber. The remaining fluid will pass through aperture 64 and as described previously a portion thereof will be similarly allowed to pass through groove 66 into the combustion chamber.

Thus, at any given peripheral point every other washer will allow fluid flow to pass into the combustion chamber. Through this selective spacing and multislot arrangement an expeditious manner of obtaining the advantages of transpiration cooling is accomplished without the attendant problems such as blocking of passages due to the porosity of the material used in transpirational cooling.

By arranging the grooves such as 52, 62 and 66 in the manner shown such that they are substantially tangential to the combustion chamber, a swirling and mixing action of the coolant as it passes into the combustion chamber occurs. This provides a complete mixing of the boundary layer to cover the inner nozzle wall.

The pyrolytic graphite washers, since they will expand when subjected to high temperatures, are biased toward each other by spring member 70. This spring member serves to force the washers together but yet allow thermal expansion of the washers during heating thereof.

While the invention has been described with reference to a separate coolant being introduced into the manifold and thence through passages 44, it is within the scope of this invention to use one of the propellants. Thus, a portion of either the fuel or the oxygen can be separately injected into these passages for eventual introduction into the combustion chamber.

Referring to FIG. 5 there is shown a modification of the washer construction illustrated in FIG. 4. In this construction, grooves 71, 72 and 73 extend from the inner surface to the outer surface of washers 16. This construction permits radial rather than tangential introduction of the cooling fluid. Additionally, this construction eliminates longitudinal passages 44 and permits the use of an annular manifold (not shown) to feed coolant to grooves 71, 72 and 73.

By arranging the grooves 71, 72 and 73 in the manner shown in FIG. 5, it is possible to meter very small amounts of coolant and yet spread the coolant evenly over the inner circumference. The coolant flow rate in each groove can be controlled by the small aperture or metering section 74 which will be remote from the hot inner edge of the washer. This metering concept permits precise, reliable, and optimum distribution of coolant flow at each station within the nozzle. After passing through the aperture or metering section 74 the coolant will expand in the groove distribution section 73 and then pass radially into the combustion chamber so that it will provide uniform circumferential coverage of the nozzle inner surface. The grooves shown in FIG. 5 cover half of the circumference at each station, and adjacent washers are staggered so that each pair of washers provide complete circumferential coverage of coolant over the inner wall.

Thus it can be seen that by this invention a new and novel structure and method of cooling a rocket engine or gas generating device has been disclosed. It is intended that the scope of this invention is to be limited only by the scope of the claims appended hereto.

What is claimed is:

1. In a rocket engine having a combustion chamber and throat formed by a nozzle wall, that improvement which comprises:
   (a) a multislotted nozzle wall, said wall being formed of a plurality of washers;
   (b) said washers having a plurality of grooves formed on at least one face thereof whereby to form with an adjacent washer a plurality of passages;
   (c) each of said washers further having a plurality of apertures therein aligned with apertures in adjacent washers whereby to form passages for passage of fluid through said washers, each of said grooves extending from the inner side of said nozzle wall to one of said apertures, grooves of one washer being circumferentially offset relative to the grooves of an adjacent washer to evenly distribute said fluid around said nozzle wall;

(d) whereby fluid in said passages is adapted to pass through said grooves into said rocket engine to provide a cooling boundary layer.

2. In a rocket engine according to claim 1 wherein means are provided to bias said washers toward each other.

References Cited

UNITED STATES PATENTS

| | | | |
|---|---|---|---|
| 2,749,706 | 6/1956 | Goddard | 60—265 |
| 2,902,823 | 9/1959 | Wagner | 60—266 |
| 3,069,847 | 12/1962 | Vest | 60—266 |
| 3,103,885 | 9/1963 | McLauchlan | 60—267 |
| 3,153,320 | 10/1964 | Prosser | 239—127.3 |
| 3,156,091 | 11/1964 | Kraus | 239—265.11 |
| 3,157,026 | 11/1964 | Lampert | 60—35.6 |
| 3,165,888 | 1/1965 | Keon | 60—35.6 |
| 3,305,178 | 2/1967 | Parilla | 239—127.3 |

FOREIGN PATENTS 759,901 10/1956 Great Britain.

MARK M. NEWMAN, *Primary Examiner.*

D. HART, *Assistant Examiner.*